(12) United States Patent
Lemke et al.

(10) Patent No.: US 8,603,197 B2
(45) Date of Patent: Dec. 10, 2013

(54) WAX COMPOSITIONS AND METHODS OF PREPARING WAX COMPOSITIONS

(75) Inventors: Daniel Wayne Lemke, Cokato, MN (US); Michael C. Thiede, Maple Grove, MN (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 854 days.

(21) Appl. No.: 12/539,877

(22) Filed: Aug. 12, 2009

(65) Prior Publication Data
US 2010/0024281 A1    Feb. 4, 2010

Related U.S. Application Data

(63) Continuation of application No. PCT/US2008/002039, filed on Feb. 15, 2008.

(60) Provisional application No. 60/902,025, filed on Feb. 16, 2007.

(51) Int. Cl.
*C11C 5/00* (2006.01)

(52) U.S. Cl.
USPC .......................................................... 44/275

(58) Field of Classification Search
USPC ............. 424/486; 264/237; 426/94; 431/288; 554/145; 44/275
See application file for complete search history.

(56) References Cited

U.S. PATENT DOCUMENTS

| | | | |
|---|---|---|---|
| 1,935,946 A | 11/1933 | Egan et al. |
| 1,954,659 A | 4/1934 | Will |
| 2,468,799 A | 5/1949 | Ziels et al. |
| 2,784,891 A | 3/1957 | Thielke |
| 3,448,178 A | 6/1969 | Flanagan |
| 3,630,697 A | 12/1971 | Duling et al. |
| 3,645,705 A | 2/1972 | Miller et al. |
| 3,744,956 A | 7/1973 | Hess |
| 3,844,706 A | 10/1974 | Tsaras |
| 4,118,203 A | 10/1978 | Beardmore et al. |
| 4,134,718 A | 1/1979 | Kayfetz et al. |
| 4,292,088 A | 9/1981 | Scheuffgen et al. |
| 4,293,345 A | 10/1981 | Zeilstra et al. |
| 4,314,915 A | 2/1982 | Wiegers et al. |
| 4,390,590 A | 6/1983 | Saunders et al. |
| 4,411,829 A | 10/1983 | Schulte-Elte et al. |
| 4,434,306 A | 2/1984 | Kobayashi et al. |
| 4,507,077 A | 3/1985 | Sapper |
| 4,545,941 A | 10/1985 | Rosenburg |
| 4,554,107 A | 11/1985 | Takao |
| 4,567,548 A | 1/1986 | Schneeberger |
| 4,608,011 A | 8/1986 | Comstock |
| 4,614,625 A | 9/1986 | Wilson |
| 4,623,488 A | 11/1986 | Takao |
| 4,714,496 A | 12/1987 | Luken, Jr. et al. |
| 4,759,709 A | 7/1988 | Luken, Jr. et al. |
| 4,813,975 A | 3/1989 | Poulina et al. |
| 4,842,648 A | 6/1989 | Phadoemchit et al. |
| 4,855,098 A | 8/1989 | Taylor |
| 4,923,708 A | 5/1990 | Given, Jr. |
| 5,171,329 A | 12/1992 | Lin |
| 5,258,197 A | 11/1993 | Wheeler et al. |
| 5,338,187 A | 8/1994 | Elharar |
| 5,380,544 A | 1/1995 | Klemann et al. |
| 5,578,089 A | 11/1996 | Elsamaloty |
| 5,660,865 A | 8/1997 | Pedersen et al. |
| 5,700,516 A | 12/1997 | Sandvick et al. |
| 5,723,137 A | 3/1998 | Wahle et al. |
| 5,753,015 A | 5/1998 | Sinwald et al. |
| 5,843,194 A | 12/1998 | Spaulding |
| 5,885,600 A | 3/1999 | Blum et al. |
| 5,888,487 A | 3/1999 | Baumoeller et al. |
| 6,001,286 A | 12/1999 | Sleeter |
| 6,019,804 A | 2/2000 | Requejo et al. |
| 6,022,402 A | 2/2000 | Stephenson et al. |
| 6,063,144 A | 5/2000 | Calzada et al. |
| 6,099,877 A | 8/2000 | Schuppan |
| 6,103,308 A | 8/2000 | Floyd et al. |
| 6,106,597 A | 8/2000 | Starks et al. |
| 6,123,979 A | 9/2000 | Hepburn et al. |
| 6,127,326 A | 10/2000 | Dieckmann et al. |
| 6,132,742 A | 10/2000 | Le Bras et al. |
| 6,156,369 A | 12/2000 | Eger et al. |
| 6,201,053 B1 | 3/2001 | Dieckmann et al. |
| 6,214,918 B1 | 4/2001 | Johnson et al. |
| 6,224,641 B1 | 5/2001 | Matzat et al. |
| 6,238,926 B1 | 5/2001 | Liu et al. |
| 6,255,375 B1 | 7/2001 | Michelman |
| 6,258,965 B1 | 7/2001 | O'Lenick, Jr. |
| 6,262,153 B1 | 7/2001 | Webster et al. |
| 6,276,925 B1 | 8/2001 | Varga |
| 6,277,310 B1 | 8/2001 | Sleeter |
| 6,284,007 B1 | 9/2001 | Tao |

(Continued)

FOREIGN PATENT DOCUMENTS

DE    19956226    5/2001
EP    0536861 A1   4/1993

(Continued)

OTHER PUBLICATIONS

International Search Report for International Application No. PCT/US2008/002039, dated Jun. 27, 2008, 8 pages.

(Continued)

*Primary Examiner* — James Goloboy
*Assistant Examiner* — Chantel Graham
(74) *Attorney, Agent, or Firm* — Brinks Gilson & Lione

(57) ABSTRACT

Described are morphology stable wax compositions comprising the (trans)esterification product of a wax-forming composition comprising: (a) a triglyceride stock, a fatty acid stock, or a mixture thereof; and (b) a glycerol-based composition comprising glycerol, polyglycerol, or a mixture thereof. Methods of making the waxes are also described. The wax compositions may be used in candles, stack waxes, jell candles, cosmetics, food coatings, adhesives, board manufacturing (e.g., particle board and oriented strand board), urethane foams or coatings, alkyd coatings, coating formulation additives, printing additives, polymer processing agents, extrusion processing aids, polymer plasticizers, mold releases, polishes, and stick markers.

28 Claims, No Drawings

(56) References Cited

U.S. PATENT DOCUMENTS

| | | |
|---|---|---|
| 6,387,405 B1 * | 5/2002 | Shah et al. .................... 424/486 |
| 6,497,735 B2 | 12/2002 | Tao |
| 6,503,077 B2 | 1/2003 | Orth et al. |
| 6,503,285 B1 | 1/2003 | Murphy |
| 6,582,748 B1 | 6/2003 | Loh et al. |
| 6,586,506 B2 | 7/2003 | Webster et al. |
| 6,599,334 B1 | 7/2003 | Anderson |
| 6,645,261 B2 | 11/2003 | Murphy et al. |
| 6,673,763 B1 | 1/2004 | Hansen et al. |
| 6,730,137 B2 | 5/2004 | Pesu et al. |
| 6,733,548 B2 | 5/2004 | Rasmussen et al. |
| 6,758,869 B2 | 7/2004 | Roeske et al. |
| 6,770,104 B2 | 8/2004 | Murphy |
| 6,773,469 B2 | 8/2004 | Murphy |
| 6,797,020 B2 | 9/2004 | Murphy |
| 6,824,572 B2 | 11/2004 | Murphy |
| 6,846,573 B2 | 1/2005 | Seydel |
| 6,852,140 B1 | 2/2005 | Roeske |
| 6,943,262 B2 | 9/2005 | Kodali et al. |
| 7,037,439 B2 | 5/2006 | Tavares |
| 7,128,766 B2 | 10/2006 | Murphy et al. |
| 7,176,171 B2 | 2/2007 | Nieendick et al. |
| 7,192,457 B2 * | 3/2007 | Murphy et al. ............... 44/275 |
| 7,217,301 B2 | 5/2007 | Murphy et al. |
| 7,387,649 B2 | 6/2008 | Tao |
| 7,462,205 B2 | 12/2008 | Murphy |
| 7,510,584 B2 | 3/2009 | Cap |
| 7,569,084 B2 | 8/2009 | Tao et al. |
| 7,588,607 B1 | 9/2009 | Cap |
| 7,601,184 B2 | 10/2009 | Tischendorf |
| 7,637,968 B2 | 12/2009 | Murphy |
| 7,833,294 B2 * | 11/2010 | Murphy et al. ............... 44/275 |
| 8,157,873 B2 * | 4/2012 | Murphy et al. ............... 44/275 |
| 2001/0013195 A1 | 8/2001 | Tao |
| 2001/0051680 A1 | 12/2001 | Webster et al. |
| 2002/0005007 A1 | 1/2002 | Roeske et al. |
| 2002/0144455 A1 | 10/2002 | Bertrand et al. |
| 2002/0157303 A1 | 10/2002 | Murphy et al. |
| 2003/0008257 A1 | 1/2003 | Tao |
| 2003/0017431 A1 | 1/2003 | Murphy |
| 2003/0022121 A1 | 1/2003 | Biggs |
| 2003/0046860 A1 | 3/2003 | Tiffany et al. |
| 2003/0057599 A1 * | 3/2003 | Murphy et al. ............... 264/237 |
| 2003/0061760 A1 | 4/2003 | Tao et al. |
| 2003/0091949 A1 * | 5/2003 | Pesu et al. .................... 431/288 |
| 2003/0110683 A1 | 6/2003 | Murphy |
| 2003/0134244 A1 | 7/2003 | Gray et al. |
| 2003/0198826 A1 | 10/2003 | Seydel |
| 2003/0207971 A1 | 11/2003 | Stuart, Jr. et al. |
| 2003/0213163 A1 | 11/2003 | Berger et al. |
| 2004/0000088 A1 | 1/2004 | Wesley |
| 2004/0037859 A1 | 2/2004 | Cecchi et al. |
| 2004/0047886 A1 | 3/2004 | Murphy et al. |
| 2004/0076732 A1 | 4/2004 | Valix |
| 2004/0088907 A1 | 5/2004 | Murphy |
| 2004/0088908 A1 | 5/2004 | Murphy |
| 2004/0138359 A1 | 7/2004 | Dinkelaker et al. |
| 2004/0200136 A1 | 10/2004 | Tao et al. |
| 2004/0221503 A1 | 11/2004 | Murphy et al. |
| 2004/0221504 A1 | 11/2004 | Murphy |
| 2005/0014664 A1 | 1/2005 | Nadolsky et al. |
| 2005/0060927 A1 | 3/2005 | Murphy |
| 2005/0095545 A1 | 5/2005 | Tischendorf |
| 2005/0123780 A1 | 6/2005 | Seydel |
| 2005/0158679 A1 | 7/2005 | Chen et al. |
| 2005/0269728 A1 | 12/2005 | Roos |
| 2006/0236593 A1 | 10/2006 | Cap |
| 2006/0272199 A1 | 12/2006 | Licciardello et al. |
| 2006/0272200 A1 | 12/2006 | Murphy et al. |
| 2007/0006521 A1 | 1/2007 | Licciardello et al. |
| 2007/0006522 A1 | 1/2007 | Tao |
| 2007/0039237 A1 | 2/2007 | Murphy et al. |
| 2007/0056211 A1 | 3/2007 | Li et al. |
| 2007/0144058 A1 | 6/2007 | Chen et al. |
| 2007/0151480 A1 | 7/2007 | Bloom et al. |
| 2007/0270621 A1 | 11/2007 | Millis et al. |
| 2007/0282000 A1 | 12/2007 | Murphy et al. |
| 2008/0027194 A1 | 1/2008 | Schrodi |
| 2008/0064891 A1 | 3/2008 | Lee |
| 2008/0138753 A1 | 6/2008 | Tao et al. |
| 2008/0145808 A1 | 6/2008 | Lee |
| 2008/0206411 A1 | 8/2008 | Nielsen |
| 2008/0307696 A1 | 12/2008 | Wu et al. |
| 2009/0048459 A1 | 2/2009 | Tupy et al. |
| 2009/0119977 A1 | 5/2009 | Murphy |
| 2009/0217568 A1 | 9/2009 | Murphy et al. |
| 2009/0220653 A1 * | 9/2009 | Doucet ........................ 426/94 |
| 2009/0259065 A1 | 10/2009 | Abraham et al. |
| 2009/0264672 A1 | 10/2009 | Abraham et al. |
| 2010/0044924 A1 | 2/2010 | Cap |
| 2010/0047499 A1 | 2/2010 | Braksmayer et al. |
| 2010/0094034 A1 * | 4/2010 | Kaido et al. ................. 554/145 |
| 2010/0132250 A1 | 6/2010 | Uptain et al. |
| 2010/0145086 A1 | 6/2010 | Schrodi et al. |
| 2010/0205851 A1 | 8/2010 | Uptain et al. |

FOREIGN PATENT DOCUMENTS

| | | |
|---|---|---|
| EP | 545715 A1 | 6/1993 |
| EP | 0685554 A1 | 12/1995 |
| EP | 0811664 A1 | 12/1997 |
| EP | 1801096 A1 | 6/2007 |
| JP | 56-32550 A | 4/1981 |
| JP | 04-59897 A | 2/1992 |
| JP | 06-009987 A | 1/1994 |
| JP | 09-014574 A | 1/1997 |
| WO | WO 92/00269 A1 | 1/1992 |
| WO | WO 96/00815 A1 | 1/1996 |
| WO | WO 96/14373 A1 | 5/1996 |
| WO | WO 98/45390 A1 | 10/1998 |
| WO | WO 99/27043 A1 | 6/1999 |
| WO | WO 02/30386 A1 | 4/2002 |
| WO | WO 02/092736 A1 | 11/2002 |
| WO | WO 03/012016 A1 | 2/2003 |
| WO | WO 03/051134 A2 | 6/2003 |
| WO | WO 03/057983 A1 | 7/2003 |
| WO | WO 03/104348 A1 | 12/2003 |
| WO | WO 2004/033388 A1 | 4/2004 |
| WO | WO 2004/083310 A1 | 9/2004 |
| WO | WO 2004/101720 A1 | 11/2004 |
| WO | WO 2005/042655 A2 | 5/2005 |
| WO | WO 2006/041011 A1 | 4/2006 |
| WO | WO 2006/076364 A2 | 7/2006 |
| WO | WO 2007/002999 A1 | 1/2007 |
| WO | WO 2008/008420 A1 | 1/2008 |
| WO | WO 2008/010961 A2 | 1/2008 |
| WO | WO 2008/048520 A2 | 4/2008 |
| WO | WO 2008/103289 A1 | 8/2008 |
| WO | WO 2008/140468 A2 | 11/2008 |
| WO | WO 2008/151064 A1 | 12/2008 |
| WO | WO 2008/157436 A1 | 12/2008 |

OTHER PUBLICATIONS

Behren et al., "Beeswax and other Non-Paraffin Waxes," Presented at NCA Technical Meeting, Jun. 19-20, 1991, 6 pages.

Bell et al., "Sperm Oil Replacements: Synthetic Wax Esters from Selectively Hydrogenated Soybean and Linseed Oils," Journal of the American Chemical Society, Jun. 1997, vol. 54, pp. 259-263.

Erhan et al., "Drying Properties of Metathesized Soybean Oil," Journal of American Oil Chemists' Society, AOCS Press, vol. 74, No. 6, 1997, pp. 703-706.

Frahm, "Harvest Lights: The only soy-based candle, a bright idea," available at http://www.extension.uiuc.edu/~stratsoy/new/news/html/909166253,html, Oct. 23, 1998, 2 pages.

Mol, "Applications of Olefin Metathesis in Oleochemistry: An Example of Green Chemistry," Green Chemistry, Royal Society of Chemistry, Cambridge, GB, vol. 4, 2002, pp. 5-13.

Noller, Chemistry of Organic Compounds, W.B. Saunders Company, 2nd Ed., 1957, pp. 181 and 192.

Oliefabrik et al., "Paper coating", Research Disclosure Journal, Dec. 1996, 2 pages.

(56) References Cited

OTHER PUBLICATIONS

Orso, "New Use for Soybeans Has Bright Future," available at http://www.unitedsoybean.com/news/nr981014.htm, Oct. 14, 1998, 2 pages.

Rezaei, "Hydrogenated Vegetable Oils as Candle Wax," J. of the Am. Oil Chemists' Society, vol. 12, No. 79, pp. 1241-1247 (Dec. 2002).

Tao, "Development of Vegetable Lipid-based Candles," available at http://abe.www.ecn.purdue.edu/ABE/Research/research94/REPORT.94.Book_68.htmls, 1994, 2 pages.

In Business, "America's Shining Example of Sustainable Business," available at http://www.candleworks.org, Mar./Apr. 1998, 3 pages.

Pages from Bitter Creek Candle Supply, Inc., website (http://www.execpc.com/~bcsupply) now at http://www.candlesupply.com, available at least by Jun. 29, 2000, 9 pages.

Pages from Ecowax, Nature's Gift, Inc., website (http://nglwax.com/ecowax.htm), available at least by Jul. 5, 2000, 3 pages.

Pages from Heartland Candleworks website, available at www.candleworks.org, available at least by Feb. 11, 2000, 4 pages.

Purdue Agriculture News, Purdue May Agriculture & Natural Resources Package, available at http://purduenews.uns.purdue.edu/UNS/paks/agpak.digest.9605.html, May 1996, 3 pages.

Purdue News, "Purdue students put the 'happy' back into birthday candles," available at http://www.purdue.edu/UNS/html4ever/9611.Schweitzer.candles.html, Nov. 1996, 3 pages.

Purdue News, "Purdue students put the 'happy' back into birthday candles," available at http://www.purdue.edu/UNS/html4ever/9604.Schweitzer.candles.html, May 1996, 2 pages.

Purdue University School of Agriculture, 1998 Farm Progress Show, available at http://www.admin.ces.purdue.edu/anr/98fps/fpspix/930.html, 1998, 4 pages.

European Examination Report for European Application No. 08725649.1, dated Mar. 1, 2010, 3 pages.

\* cited by examiner

WAX COMPOSITIONS AND METHODS OF PREPARING WAX COMPOSITIONS

CROSS-REFERENCE TO RELATED APPLICATIONS

This application is a Continuation of International Application No. PCT/US2008/002039, filed Feb. 15, 2008, which claims the benefit of U.S. Provisional Patent Application Ser. No. 60/902,025, filed Feb. 16, 2007, which are incorporated herein by reference.

FIELD

The present invention relates generally to wax compositions and to methods of preparing wax compositions.

BACKGROUND

Candles have been known and used for illumination since early civilization. For years, beeswax was commonly used as a natural wax for candles, cosmetics and food preservation sealing waxes. A typical candle is formed of a solid or semi-solid body of combustible waxy material, such as paraffin wax or beeswax, and contains a combustible fibrous wick embedded within the waxy material. When the wick of a candle is lit, the generated heat melts the solid wax, and the resulting liquid flows up the wick by capillary action and is combusted. At present, although many advanced illuminating devices are available, candles are still popularly used for decoration, as a scent-dispensing vehicle or on a special situation such as a holiday.

Over one hundred years ago, paraffin came into existence, parallel with the development of the petroleum refining industry. Paraffin is simply the leftover residue from refining gasoline and motor oils. Paraffin was introduced as a bountiful and low cost alternative to beeswax. In recent years, paraffin has become more costly and in less supply. Paraffin is presently the primary industrial wax for the following three uses: candles, cosmetics and sealing waxes.

Conventional candles are made from a wax material, such as paraffin. Such candles typically emit a smoke and can produce a bad smell when burning. Many people cannot accept such smell. In addition, a small amount of particles ("particles") are often created when the candle burns. These particles may affect the health of a human when inhaled. Paraffin soot particles are similar to particles given off by burning diesel fuel, which include a number of polycyclic aromatic hydrocarbons that have been deemed toxic air contaminants.

In addition to these issues, paraffin wax is diminishing in supply as consumer demand increases. New petroleum technology does not produce by-product petro-waxes. This decrease in supply requires importation of petroleum waxes. This coincides with a huge ($2.5 billion) decorative candle market in the U.S.

There is a strong consumer need and demand for alternative natural waxes as an option to paraffin waxes that can be produced at a rate that is cost competitive with paraffin. Accordingly, it would be advantageous to have other materials that can be used to form clean burning base materials for forming candles. If possible, such materials would preferably be biodegradable and be derived from renewable raw materials. The candle base materials should preferably have physical characteristics, e.g., in terms of melting point, hardness and/or malleability, that permit the material to be readily formed into candles having a pleasing appearance and/or feel to the touch, as well as having desirable olfactory properties.

There are fundamental differences in the inherent properties of the renewable saturated triglycerides when they are compared to the petroleum based straight chain aliphatic hydrocarbons that make up paraffin wax. Triglycerides exhibit well-documented polymorphic behavior where as the aliphatic hydrocarbons of paraffin does not. Polymorphism means that there are multiple crystal forms of the material that can exist. In general under rapid cooling, less stable lower melting less dense crystals form initially, but given time and heat cycles the mobility of the molecules allow their rearrangement to higher melting, more stable and more dense crystal forms. This rearrangement can lead to the problems of cracking and blooming in candle produced from vegetable wax.

The inventions disclosed herein represent approaches to resolving the physical property limitations associated with vegetable and animal-based triglycerides when used as alternatives to paraffin waxes.

SUMMARY

It has been observed that hydrogenated soybean oil that is slowly cooled from a liquid state has an undesirable tendency to crack, is undesirably brittle, and tends to exhibit more "blooming" than is commercially acceptable. The incorporation of glycerol-based compositions, for example, through esterification or transesterification can stabilize the fat morphology, thereby limiting the transition of the fat from one crystal form to another. The resulting morphology stable waxes display, in various embodiments, reduced cracking, friability, and bloom formation.

Accordingly, in one aspect the invention relates to a morphology stable wax composition comprising the (trans)esterification product of a wax-forming composition comprising: (a) a triglyceride stock, a fatty acid stock, or a mixture thereof; and (b) a glycerol-based composition comprising glycerol, polyglycerol, or a mixture thereof.

In many embodiments, the triglyceride stock comprises a vegetable oil. The vegetable oil may be partially- or fully-hydrogenated, or may be used without hydrogenation. Examples of vegetable oils include soybean oil, cottonseed oil, sunflower oil, canola oil, rapeseed oil, corn oil, peanut oil, safflower oil, palm oil, palm kernel oil, coconut oil, jatropha oil, algal oil, castor oil, or mixtures thereof.

In some embodiments, the triglyceride stock comprises animal-based oils such as tallow, fish oil, chicken fat (or yellow grease), or a mixture thereof. The animal-based oils may be partially- or fully-hydrogenated, or may be used without hydrogenation.

The triglyceride stock or fatty acid typically comprises a majority of the wax-forming composition, for example, typically ranging from about 60 wt % to about 99.9 wt % of the wax-forming composition.

The glycerol-based composition comprises species of glycerol and/or polyglycerol. In some embodiments, the glycerol-based composition comprises one or more polyglycerol species selected from the group consisting of diglycerol, triglycerol, tetraglycerol, pentaglycerol, and cyclic polyglycerol. The glycerol-based composition typically comprises about 0.1 wt % to about 35 wt % of the wax-forming composition or about 5 wt % to about 30 wt % of the wax-forming composition.

The (trans)esterification is typically conducted in the presence of a catalyst, for example, lithium, sodium, potassium, magnesium, calcium, oxide, methyl oxide, antimony oxides, hydroxide, carbonate, phosphate, phosphite, hypophosphite, and salts thereof. Other examples include potassium hydroxide, sodium hydroxide, calcium hydroxide, or a combination thereof.

The morphology stable wax composition typically has a melting point ranging from about 43° C. to about 121° C., or from about 51° C. to about 72° C. In some embodiments, the wax has a melting point and a congeal point that have a temperature difference of about 10° C. or less or about 5° C. or less.

In some embodiments, the wax-forming composition further comprises a diamine compound in order to alter the melting temperature of the wax. The diamine compound transamidates with the triglyceride stock in the wax-forming composition. Useful diamine compounds include, for example, hexamethylene diamine, ethylene diamine, or a mixture thereof.

In some embodiments, the wax-forming compositions further comprise a diacid, polyacid, or anhydride (e.g., trimellitic anhydride). The acid or anhydride builds molecular weight with the polyglycerol during the transesterification reaction adding flexibility to the resulting wax.

In another aspect, the invention provides a method of making a morphology stable wax composition. The method comprises the steps of:

(a) providing a composition comprising a triglyceride stock, a fatty acid stock, or a mixture thereof;

(b) providing a glycerol-based composition comprising glycerol, polyglycerol, or a mixture thereof; and (c) (trans)esterifying the composition of step (a) with the composition of step (b).

The (trans)esterification reaction is typically conducted under an inert atmosphere (e.g., nitrogen) in the presence of a catalyst and at an elevated temperature, for example, ranging from about 90° C. to about 232° C.

Wax compositions of the invention are suitable for use in candles and other wax-based articles. Examples include candles, stack waxes, jell candles, cosmetic, food coating, adhesive, board manufacturing (e.g., particle board and oriented strand board), urethane foams or coatings, alkyd coatings, coating formulation additive (e.g., paint, waterproof coatings, etc.), printing additives, polymer processing agent, extrusion processing aid, polymer plasticizer, mold release, polish, and stick markers.

DETAILED DESCRIPTION

The invention relates to morphology stable wax compositions and to methods of making the morphology stable wax compositions. In many embodiments, the morphology stable wax compositions comprise a fat source (e.g., a triglyceride stock (hydrogenated soybean oil) or fatty acid, or mixture thereof) that has been esterified or transesterified (i.e., (trans) esterified) with a glycerol-based composition.

As employed herein, the term "triglyceride stock" is used to refer to materials that comprise one or more triglyceride compounds. Commonly, the triglyceride stock comprises a mixture of triglyceride compounds, which very often are derivatives of C16 and/or C18 fatty acids. The triglyceride stock, whether altered or not, are generally derived from various plant and animal sources, such as oil seed sources. The term triglyceride stock includes, for example, (a) materials which have not been altered after isolation; (b) materials which have been refined, bleached and/or deodorized after isolation; (c) materials obtained by a process which includes fractionation of a triglyceride oil; and, also, (d) oils obtained from plant or animal sources and altered in some manner, for example through partial or full hydrogenation.

It will be understood that a triglyceride stock may include a mixture of triglycerides, and a mixture of triglyceride isomers. By the term "triglyceride isomers," reference is meant to triglycerides which, although including the same esterified carboxylic acid residues, may vary with respect to the location of the residues in the triglyceride. For example, a triglyceride oil such as a vegetable oil stock can include both symmetrical and unsymmetrical isomers of a triglyceride molecule which includes two different fatty acyl chains (e.g., includes both stearate and oleate groups).

As indicated above, any given triglyceride molecule includes glycerol esterified with three carboxylic acid molecules. Thus, each triglyceride includes three fatty acid residues. In general, oils extracted from any given plant or animal source comprise a mixture of triglycerides, characteristic of the specific source. The mixture of fatty acids isolated from complete hydrolysis of the triglycerides in a specific source is referred to herein as a "fatty acid profile." By the term "fatty acid profile" reference is made to the identifiable fatty acid residues in the various triglycerides. The distribution of specific identifiable fatty acids is characterized herein by the amounts of the individual fatty acids as a weight percent (wt %) of the total mixture of fatty acids obtained from hydrolysis of the particular oil stock. The distribution of fatty acids in a particular oil or fat may be readily determined by methods known to those skilled in the art, such as by gas chromatography.

Palmitic acid ("16:0") and stearic acid ("18:0") are saturated fatty acids and triglyceride acyl chains formed by the esterification of either of these acids do not contain any carbon-carbon double bonds. The nomenclature in the above abbreviations refers to the number of total carbon atoms in fatty acid followed by the number of carbon-carbon double bonds in the chain. Many fatty acids such as oleic acid, linoleic acid and linolenic acid are unsaturated (i.e., contain one or more carbon-carbon double bonds). Oleic acid is an 18 carbon fatty acid with a single double bond (i.e., an 18:1 fatty acid), linoleic acid is an 18 carbon fatty acid with two double bonds or points of unsaturation (i.e., an 18:2 fatty acid), and linolenic is an 18 carbon fatty acid with three double bonds (i.e., an 18:3 fatty acid).

In many embodiments, the triglyceride stock comprises a vegetable oil. The vegetable oil may be partially- or fully-hydrogenated, or may be used without hydrogenation. Examples include soybean oil, cottonseed oil, sunflower oil, canola oil, rapeseed oil, corn oil, olive oil, peanut oil, safflower oil, palm oil, coconut oil, jatropha oil, algal oil, castor oil, or mixtures thereof.

In some embodiments, the triglyceride stock comprises an animal-based oils such as tallow, fish oil, chicken fat (or yellow grease), or a mixture thereof. The animal-based oils may be partially- or fully-hydrogenated, or may be used without hydrogenation.

In many embodiments high in soybean oil, the fatty acid profile of the triglyceride stock typically comprises predominantly fatty acids having 16 and 18 carbon atoms. The amount of shorter chain fatty acids, for example, fatty acids having 14 carbon atoms or less in the fatty acid profile of the triglycerides is generally low, for example, in some embodiments no more than about 1.0 wt %. The triglyceride stock may include a moderate amount of saturated 16 carbon fatty acid, for example, typically about 14 wt % to about 25 wt %. Suitable triglyceride stocks may about 15 wt % to about 20 wt % saturated 16 carbon fatty acid.

In many embodiments high in soybean oil, the fatty acid profile of the triglyceride stock commonly includes a significant amount of C18 fatty acids. The fatty acid profile typically includes a mixture of saturated (18:0-stearic acid) and monounsaturated fatty acids (18:1). The unsaturated fatty acids are commonly monounsaturated fatty acids (18:1), such as oleic acid. In some embodiments, the triglycerides have a fatty acid profile which includes about 14 to 25 wt % 16:0 fatty acid; about 35 to 45 wt % 18:0 fatty acid; and about 35 to 45 wt % 18:1 fatty acid.

In embodiments comprising coconut oil, the fatty acid profile of the triglyceride stock may include up to about 15 wt % of fatty acids having 14 or less carbon atoms. Embodiments comprising palm oil may have up to about 50 wt % of fatty acids having 16 or less carbon atoms.

Also useful in the morphology stable waxes of the invention are tropical oils such as palm and coconut, which have fatty acid profiles that are different than those described above. Algae oils have a wider range of fatty acid composition including longer chain fatty acids. Castor oil would be different as well and contains predominantly ricolenic acid.

Useful triglyceride stocks for use in the wax compositions of the invention have generally been neutralized and bleached. The triglyceride stock may have been processed in other ways prior to use, e.g., via fractionation, hydrogenation, refining, and/or deodorizing. Preferably, the feedstock is a refined, bleached triglyceride stock. The processed feedstock material may be blended with one or more other triglyceride feedstocks to produce a material having a desired distribution of fatty acids, in terms of carbon chain length and degree of unsaturation. In some embodiments, the triglyceride stock is hydrogenated (e.g., partially- or fully-hydrogenated) to reduce the overall degree of unsaturation in the material and provide a triglyceride stock having physical properties which are desirable for a candle-making base material.

The triglyceride stock may be hydrogenated to obtain a desired set of physical characteristics (e.g., in terms of melting point, solid fat content and/or Iodine value). The hydrogenation is typically carried out at elevated temperature, such as 400° F. to 450° F. (about 205° C. to about 230° C.), and relatively low hydrogen pressure (e.g., no more than about 25 psi) in the presence of a hydrogenation catalyst. One example of a suitable hydrogenation catalyst, is a nickel catalyst, such as a powdered nickel catalyst provided as a 20-30 wt. % in a solid vegetable oil.

In an exemplary embodiment of the invention, the triglyceride stock comprises fully-hydrogenated soybean oil. Fully hydrogenated soybean oil typically has an iodine value (IV) that ranges from about 0 to about 5.

Glycerol-based compositions that are used in the present invention may be obtained from any suitable source. In many embodiments, the glycerol-based composition is derived from a renewable, natural source. Given the anticipated abundance of glycerol that is expected to be available as a byproduct of biodiesel production, naturally derived glycerol is expected to be abundant for the foreseeable future and may be used to form suitable glycerol-based compositions for use in the present invention.

In many embodiments, the glycerol-based composition comprises a majority of linear polymers of glycerol. Linear polymers of glycerol may be represented structurally by the formula:

where n ranges typically ranges from about 2 to about 10.

In addition to polyglycerol, the glycerol-based compositions typically also include glycerol and a minor amount of cyclic polyglycerol species.

Glycerol-based compositions may be characterized by their hydroxyl value. In many embodiments of the invention, the glycerol-based compositions have a hydroxyl value (i.e., OH value) that ranges from bout 800 to about 1800. In other embodiments, the hydroxyl value ranges from about 1500 to about 1600. In some embodiments, the glycerol-based composition is fractionated to produce a desired distribution of glycerol polymers and a desired OH value.

In some embodiments, the glycerol-based composition comprises one or more polyglycerol species selected from the group consisting of diglycerol, triglycerol, tetraglycerol, pentaglycerol, and cyclic polyglycerol. In other embodiments, the glycerol-based composition comprises glycerol and one or more polyglycerol species selected from the group consisting of diglycerol, triglycerol, tetraglycerol, pentaglycerol, and cyclic polyglycerol.

In some embodiments, the glycerol-based composition comprises: about 75 wt % or greater total of polyglycerol species comprising diglycerol, triglycerol, and tetraglycerol; and up to about 10 wt % or less total of polyglycerol species of hexaglycerol and greater.

In some embodiments, the glycerol-based composition comprises about 20 wt % to about 40 wt % diglycerol. In some embodiments, the glycerol-based composition comprises about 5% to about 30 wt % triglycerol. In some embodiments, the glycerol-based composition comprises about 1 wt % to about 65 wt % glycerol. In some embodiments, the glycerol-based composition comprises about 1 wt % to about 20 wt % tetraglycerol. In some embodiments, the glycerol-based composition comprises about 30 wt % to about 65 wt % glycerol.

Also useful are glycerol-based compositions comprising: (i) about 0 to about 70 wt % glycerol; about 20 to 40 wt % diglycerol; about 5 to 30 wt % triglycerol; about 0 to 20 wt % tetraglycerol; about 0 to 10 wt % pentaglycerol; about 0 to 10 wt % hexaglycerol; about 0 to 5 wt % hexaglycerol; and about 0 to 5 wt % cyclic polyglycerol; (ii) about 55 to 65 wt % glycerol; about 20 to 30 wt % diglycerol; about 5 to 15 wt % triglycerol; about 1 to 10 wt % tetraglycerol; and up to about 5 wt % pentaglycerol; (iii) about 30 to 35 wt % glycerol; about 25 to 35 wt % diglycerol; about 15 to 20 wt % triglycerol; about 5 to 10 wt % tetraglycerol; up to about 5 wt % pentaglycerol; up to about 5 wt % hexaglycerol; and up to about 5 wt % cyclic glycerol; or (iv) up to about 5 wt % glycerol; about 30 to 40 wt % diglycerol; about 20 to 30 wt % triglycerol; about 10 to 20 wt % tetraglycerol; about 5 to 15 wt % pentaglycerol; about to about 10 wt % hexaglycerol; up to about 10 wt % heptaglycerol and higher order oligomers; and up to about 5 wt % cyclic glycerol. Mixtures of the foregoing may also be used.

In an exemplary embodiment, the glycerol-based composition comprises about 60 wt % glycerol; about 24 wt % diglycerol; about 10 wt % triglycerol; about 5 wt % tetraglycerol; and about 1 wt % pentaglycerol. In another exemplary embodiment, the glycerol-based composition comprises about 33 wt % glycerol; about 30 wt % diglycerol; about 18 wt % triglycerol; about 8 wt % tetraglycerol; about 4 wt % pentaglycerol; about 2 wt % hexaglycerol; and about 5 wt % cyclic glycerol. In yet another exemplary embodiment, the glycerol-based composition comprises about 3 wt % glycerol; about 37 wt % diglycerol; about 26 wt % triglycerol; about 14 wt % tetraglycerol; about 8 wt % pentaglycerol; about 6 wt % hexaglycerol; about 2 wt % heptaglycerol and higher order oligomers; and about 4 wt % cyclic glycerol.

Examples of processes suitable for the production of glycerol-based composition include the method reported in WO US2007/092407 entitled "Process for Preparing Polyglycerol and Mixed Ethers" and the method reported in U.S. Pat. No. 6,620,904 (Lemke) entitled "Processes for Preparing Linear Polyglycerols and Polyglycerol Esters". The distribution of polymers of glycerol in the glycerol-based composition may represent, for example, any of the mixtures typically achieved by an alkali catalyzed process.

Examples of polyglycerol compositions include those commercially available under the trade designation "POLYGLYCEROL-3" from Solvay. POLYGLYCEROL-3 comprises about 15 to 30 wt % diglycerol; about 35 to 55 wt % triglycerol; about 10 to 25 wt % tetraglycerol; up to about 10 wt % pentaglycerol; and up to about 5 wt % hexaglycerol and higher order oligomers.

In many embodiments, glycerol-based composition is incorporated into a triglyceride stock or fatty acid composition (e.g., hydrogenated soybean fatty acid, coconut fatty acid, etc.) by esterification or transesterification (i.e., (trans) esterification) to yield a first composition.

Polyglycerol compositions may be incorporated into the triglyceride stock and/or fatty acid composition in a variety of known processes including transesterification, esterification, or by a combination of these processes. Suitable catalysts for the reaction include lithium, sodium, potassium, magnesium, calcium, etc. oxide, methyl oxide, antimony oxides, hydroxide, carbonate, phosphate, phosphite, hypophosphite, etc. salts. Potassium, sodium, and calcium hydroxides or oxides are preferred catalysts. Appropriate operating conditions using such catalysts are known to those skilled in the art.

The morphology stable wax composition of the invention typically comprises a majority by weight of a triglyceride, fatty acid, or mixture thereof, and a minor amount of the glycerol-based composition. The amount of the glycerol-based composition that is incorporated typically ranges from about 0.1 wt % to about 35 wt %, for example, more typically ranging from about 5 wt % to about 30 wt %. A range of about 8 wt % to about 20 wt % is typical for many applications. The remainder of the mixture typically comprises a triglyceride stock, fatty acids, or mixtures thereof. In many implementations, the triglyceride stock comprises a majority of the mixture, typically about 60 wt % to about 99.9 wt %, for example, about 70 wt % to about 95 wt %.

(Trans)esterification causes the hydroxyl number of the polyglycerol composition to be reduced as the triglyceride stock and/or fatty acid reacts with the polyglycerol composition to form ester groups. In many embodiments, the resulting wax has a hydroxyl number that is about 600 mg KOH/gram or less, more typically about 200 mg KOH/gram or less.

In one exemplary embodiment about 10 wt % glycerol composition is mixed with about 90 wt % hydrogenated soybean oil and about 500 ppm sodium hydroxide. The mixture is then heated to a temperature of about 230° C. under a nitrogen sparge. The mixture is then held at temperature until it turns clear, and then for about 0.5 hours additional time. The resulting composition is then cooled to about 100° C. fairly quickly, followed by cooling at slower rate. For example, the mixture may be cooled to less than about 100° C., transferred to a container (e.g., ajar), and the container placed into a preheated oven at about 80° C. Turning off the oven allows the composition to cool slowly to room temperature. The resulting product is a homogeneous wax that is free of bloom and cracks, and is resilient to chipping when hit or picked at.

Stack candles that were prepared from blends comprising hydrogenated soybean oil and the transesterification product of hydrogenated soybean oil and glycerol or the transesterification product of hydrogenated soybean oil and a glycerol/polyglycerol composition showed that the candles prepared with glycerol yielded free glycerol in the hot wax when the candle was burned, whereas the candles that were prepared from glycerol/polyglycerol showed good phase stability with no apparent phase separation.

It was also observed that the congeal point of the wax prepared with glycerol/polyglycerol was about 5° C. cooler than the melting point of the wax. This is desirable since it is similar to the performance of paraffin waxes. By contrast, fully-hydrogenated soybean oil typically has a congealing point that is about 12° C. cooler than its melting point. Accordingly, embodiments of the morphology stable wax compositions of the invention have a congeal point that is about 10° C. cooler (or less) than the melting point of the wax, or about 8° C. cooler (or less) than the melting point of the wax, or about 6° C. cooler (or less) than the melting point of the wax, or about 5° C. cooler (or less) then the melting point of the wax.

Wax compositions of the invention may be alone or may be used in blends with other waxes. Examples of waxes include petroleum-based waxes (e.g., paraffin wax), or other esters, amides, triglyceride waxes with varying levels of hydrogenation, metathesized waxes, fatty acids with varying levels of hydrogenation, fatty acid soaps (sodium, potassium, etc), alkyl esters (methyl ester), metathesis side streams, FFA, FAME, FAEE, and the like.

Morphology stable waxes of the invention may be produced using batch or continuous processes. In a continuous process the raw materials are continuously injected and product is continuously removed. For example, polyglycerol and triglyceride can be continuously injected into a high sheer mixer and heated to 100° C. to 275° C., preferably between 230° C. to 260° C. The mixture is held either by the volume of the mixer or by the length of the heat exchanger and is allowed to transesterify. The catalyst, pumping rate of the raw materials into the mixer, the sheer applied by the mixer and the heat exchanger volume and hold times may be varied to optimize the rate of through-put through the system.

In some embodiments of the invention, a morphology stable wax of the invention is prepared in a one step process by mixing glycerol, triglyceride stock (e.g., hydrogenated soybean oil) and/or a fatty acid composition along with a transesterification catalyst (e.g., potassium hydroxide or calcium hydroxide, etc.). The resulting composition is then heated (e.g., to a temperature of about 200° C. to 250° C.) under nitrogen sparge and vacuum (e.g., 150 mmHg to atmospheric). Under these conditions, at least a portion of the glycerol polymerizes to form polyglycerol. The resulting polyglycerol reacts with the triglyceride and/or fatty acid composition in an esterification/transesterification reaction to provide a morphology stable wax of the invention. Typically, the amount of triglyceride or fatty acid in the composition ranges from about 80 wt % to about 93 wt %, and the amount of glycerol ranges from about 7 wt % to about 20 wt %. The amount of transesterification catalyst typically ranges from about 200 to about 2000 ppm.

In an exemplary embodiment, glycerol (e.g., about 12 wt %), hydrogenated soybean oil (e.g., about 87.8 wt %), and potassium hydroxide (e.g., about 0.2 wt %) are charged into a reaction vessel. Under nitrogen sparge, the charge is heated to about 230° C. and vacuum is applied (e.g., to about 160 mmHg). The OH value of the composition is monitored and the morphology stable wax is considered functional when the OH has dropped by about 20-50 units, preferably about 20-30 units.

In some embodiments of the invention, the melting point of the wax may be increased by modifying the process to include a diamine compound. Examples of suitable diamine compounds include hexamethylene diamine and ethylene diamine, although other diamine compounds may also be suitable. Diamine may be added to the composition until the desired melting point is achieved. Typical high melting points waxes prepared in this manner have melting points ranging from about 76° C. to about 122° C.

In some embodiments of the invention, the flexibility of the wax may be modified by including a diacid, polyacid, or anhydride (e.g., trimellitic anhydride) in the initial reactant charge. The acid or anhydride builds molecular weight with the polyglycerol during the transesterification reaction adding flexibility to the resulting wax.

Morphology stable wax compositions of the invention may be used in various embodiments including, for example, candle waxes, stack waxes, jell candles (a diamine and/or diacid may be used to control the viscosity), cosmetics, food coatings (e.g., for coating fruit, cheese, or vegetables), adhesives, board manufacturing (e.g., particle board and oriented strand board), urethane foams or coatings, alkyd coatings, coating formulation additive (e.g., paint, waterproof coatings, etc.), printing additives, and stick markers.

Candles can be produced from the wax of the invention using a number of different methods. In one typical process, the wax is heated to a molten state. If other additives such as colorants and/or fragrance oils are to be included in the candle formulation, these may be added to the molten wax or mixed with the wax prior to heating. The molten wax is then solidified around a wick. For example, the molten wax can be poured into a mold which includes a wick disposed therein. The molten wax is then cooled to solidify the wax in the shape of the mold. Depending on the type of candle being produced, the candle may be unmolded or used as a candle while still in the mold. Examples of molded candles include container candles which typically include an outer glass or metal container. Examples of unmolded candles include pillar candles and taper candles. Where the candle is designed to be used in unmolded form, it may also be coated with an outer layer of higher melting point material.

Alternatively, the wax can be formed into a desired shape, e.g., by pouring molten wax into a mold and removing the shaped material from the mold after it has solidified. A wick may then be inserted into the shaped wax material using techniques known to those skilled in the art (e.g., using a wicking machine such as a Kurschner wicking machine).

The candle wax may be fashioned into a variety of forms, commonly ranging in size from powdered or ground wax particles approximately one-tenth of a millimeter in length or diameter to chips, flakes or other pieces of wax approximately two centimeters in length or diameter. Where designed for use in compression molding of candles, the waxy particles are generally spherical, prilled granules having an average mean diameter no greater than about one (1) millimeter.

Prilled wax particles may be formed conventionally, by first melting the wax in a vat or similar vessel and then spraying the molten waxy material through a nozzle into a cooling chamber. The finely dispersed liquid solidifies as it falls through the relatively cooler air in the chamber and forms prilled granules that, to the naked eye, appear to be spheroids about the size of grains of sand. Once formed, the prilled wax can be deposited in a container and, optionally, combined with the coloring agent and/or scenting agent.

Wax compositions of the invention may include other components, as well, such as coloring agents, scenting agents, paraffin, migration inhibitors, and the like. A variety of such additives are disclosed, for example, in U.S. Pat. Nos. 6,770,104 and 6,824,572, the entirety of each of which is incorporated herein by reference.

A wide variety of coloring and scenting agents, well known in the art of candle making, are available for use with waxy materials. Typically, one or more dyes or pigments is employed provide the desired hue to the color agent, and one or more perfumes, fragrances, essences or other aromatic oils is used provide the desired odor to the scenting agent. The coloring and scenting agents generally also include liquid carriers which vary depending upon the type of color- or scent-imparting ingredient employed. The use of liquid organic carriers with coloring and scenting agents is preferred because such carriers are compatible with petroleum-based waxes and related organic materials. As a result, such coloring and scenting agents tend to be readily absorbed into waxy materials. It is especially advantageous if a coloring and/or scenting agent is introduced into the waxy material when it is in the form of prilled granules.

The colorant is an optional ingredient and is commonly made up of one or more pigments and dyes. Colorants are typically added in a quantity of about 0.001-2 wt. % of the waxy base composition. If a pigment is employed, it is typically an organic toner in the form of a fine powder suspended in a liquid medium, such as a mineral oil. It may be advantageous to use a pigment that is in the form of fine particles suspended in a vegetable oil, e.g., a natural oil derived from an oilseed source such as soybean or corn oil. The pigment is typically a finely ground, organic toner so that the wick of a candle formed eventually from pigment-covered wax particles does not clog as the wax is burned. Pigments, even in finely ground toner forms, are generally in colloidal suspension in a carrier.

If a dye constituent is utilized, it may be dissolved in an organic solvent. A variety of pigments and dyes suitable for candle making are listed in U.S. Pat. No. 4,614,625, the disclosure of which is herein incorporated by reference. The preferred carriers for use with organic dyes are organic solvents, such as relatively low molecular weight, aromatic hydrocarbon solvents; e.g. toluene and xylene. The dyes ordinarily form true solutions with their carriers. Since dyes tend to ionize in solution, they are more readily absorbed into the prilled wax granules, whereas pigment-based coloring agents tend to remain closer to the surface of the wax.

Candles often are designed to appeal to the olfactory as well as the visual sense. This type of candle usually incorporates a fragrance oil in the waxy body material. As the waxy material is melted in a lighted candle, there is a release of the fragrance oil from the liquefied wax pool. The scenting agent may be an air freshener, an insect repellent or more serve more than one of such functions.

The air freshener ingredient commonly is a liquid fragrance comprising one or more volatile organic compounds which are available from perfumery suppliers such IFF, Firmenich Inc., Takasago Inc., Belmay, Noville Inc., Quest Co., and Givaudan-Roure Corp. Most conventional fragrance materials are volatile essential oils. The fragrance can be a synthetically formed material, or a naturally derived oil such as oil of Bergamot, Bitter Orange, Lemon, Mandarin, Caraway, Cedar Leaf, Clove Leaf, Cedar Wood, Geranium, Lavender, Orange, Origanum, Petitgrain, White Cedar, Patchouli, Lavandin, Neroli, Rose and the like.

A wide variety of chemicals are known for perfumery such as aldehydes, ketones, esters, alcohols, terpenes, and the like. A fragrance can be relatively simple in composition, or can be a complex mixture of natural and synthetic chemical components. A typical scented oil can comprise woody/earthy bases containing exotic constituents such as sandalwood oil, civet, patchouli oil, and the like. A scented oil can have a light floral fragrance, such as rose extract or violet extract. Scented oil also can be formulated to provide desirable fruity odors, such as lime, lemon or orange.

Synthetic types of fragrance compositions either alone or in combination with natural oils such as described in U.S. Pat. Nos. 4,314,915; 4,411,829; and 4,434,306; incorporated herein by reference. Other artificial liquid fragrances include geraniol, geranyl acetate, eugenol, isoeugenol, linalool, linalyl acetate, phenethyl alcohol, methyl ethyl ketone, methylionone, isobornyl acetate, and the like. The scenting agent can also be a liquid formulation containing an insect repellent such as citronellal, or a therapeutic agent such as eucalyptus or menthol. Once the coloring and scenting agents have been formulated, the desired quantities are combined with waxy material which will be used to form the body of the candle. For example, the coloring and/or scenting agents can be added to the waxy materials in the form of prilled wax granules. When both coloring and scenting agents are employed, it is generally preferable to combine the agents together and then add the resulting mixture to the wax. It is also possible, however, to add the agents separately to the waxy material. Having added the agent or agents to the wax, the granules are coated by agitating the wax particles and the coloring and/or scenting agents together. The agitating step commonly consists of tumbling and/or rubbing the particles and agent(s) together. Preferably, the agent or agents are distributed substantially uniformly among the particles of wax, although it is entirely possible, if desired, to have a more random pattern of distribution. The coating step may be accomplished by hand, or with the aid of mechanical tumblers and agitators when relatively large quantities of prilled wax are being colored and/or scented.

The invention will now be described with reference to the following non-limiting examples.

EXAMPLES

Example 1

Preparation of Polyglycerol Ester from Polyglycerol and Fully hydrogenated soybean oil. Polyglycerol (39.0 lbs., 10.0 wt %) and fully hydrogenated soybean oil (Cargill "Stable Flake", Iodine Value<2, 351 lbs, 90.0 wt %) were charged into a stainless steel fifty gallon reactor equipped with nitrogen sparge, over head condenser, and agitation. The distribution of the polyglycerol by GC area count was: glycerol (60.8%); diglycerol (22.6%); triglycerol (9.5%); tetraglycerol (3.4 wt %); pentaglycerol (1.1 wt %) and total cyclic polyglycerol (1.6 wt %). The nitrogen sparge was set at 1.9 l/min during the addition and through out the reaction. The agitator was turned on and set at 60 rpm. The batch was heated to 235° C. at a rate of 1.5° C./min. The batch was sampled at 1 hour (two-phase product), at 1.5 hours (product clearing with slight haze) and 2.0 hours (product was clear). The batch was held for an additional fifteen minutes and then cooled to 80° C. The batch cooled was from 235° C. to 205° C. in 15 minutes, from 205° C. to 181° C. in a second 15 minutes, and 181° C. to 160° C. in a further fifteen minutes, totaling forty-five minutes. The final product was flaked and analyzed and had the properties shown in TABLE 1.

TABLE 1

| Property | Value |
| --- | --- |
| Gardner Color | <1 |
| Acid Value | 0.1 |
| Hydroxyl Value | 147 |
| Density | 0.97 g/ml (solid) |
| | 0.89 g/ml (liquid) |
| Appearance in Melt | Clear |

Example 2

This example reports the evaluation and comparison of esters prepared from various polyglycerol and glycerol streams. The glycerol and polyglycerol esters were prepared in the same fashion as described in Experiment 1. All charges were based on a 90 wt % fully hydrogenated soybean oil and 10 wt % polyol reaction. The paraffin example is a blended paraffin specifically developed for the preparation of candles.

Test Method (Melting and Congeal Points): The melting and congeal points were collected on a Perkin Elmer Differential Scanning Calorimeter DSC 7.

Test Method (Blooming/Cracking): The wax was melted in an oven at approximately 73° C. 100 mL of each wax was poured into a plastic cup at room temperature and allowed to cool on the countertop. The next day, samples were inspected visually for any cracks. They were also inspected visually for any signs of fat bloom which is normally indicated by a white powdery film on the surface or by bumps in the wax. The bumps can sometimes look like small pieces of cauliflower. The samples were re-checked the samples for fat bloom after 1 month of aging at room temperature. For samples indicated as not having fat bloom, they were still free from any signs after 1 month of room-temperature aging.

The testing is summarized in TABLE 2.

TABLE 2

| Description | Blooming Properties | Cracking Properties | Glass Adhesion | Melting Point (° C.) | Congeal Point (° C.) | Comments And Polyglycerol Distribution |
| --- | --- | --- | --- | --- | --- | --- |
| Paraffin | None | None | Good | 63 | 55 | Test sample supplied by Hanna Inc. |
| Hydrogenated Soybean oil (IV < 2) | Severe | Severe | Poor | 69 | 42 | Notable shrinkage on congeal |
| Wax prepared using glycerol | None | Some on surface | Good | 62 | 50 | After a burn cycle in a candle test glycerol was seen pooling in the liquid |

TABLE 2-continued

| Description | Blooming Properties | Cracking Properties | Glass Adhesion | Melting Point (°C.) | Congeal Point (°C.) | Comments And Polyglycerol Distribution |
|---|---|---|---|---|---|---|
| Wax prepared using polyglycerol 2-1 | None | None | Good | 63 | 55 | wax on top of the candle. Product is most like paraffin. No glycerol pooling was seen after a candle burn test. Polyglycerol 2-1 distribution: glycerol 60%; diglycerol 24%; triglycerol 10%; tetraglycerol 5%; and pentaglycerol and higher 1% |
| Wax prepared using polyglycerol 2-2 | None | Some on surface | Good | | | Polyglycerol 2-2 distribution: glycerol 30.0%; diglycerol 30.4%; triglycerol 19.6%; tetraglycerol 9.5%; pentaglycerol 5.4%; hexaglycerol 4.2%; heptaglycerol 0.7%; and octaglycerol and higher 0.2% |
| Wax prepared using polyglycerol 2-3 | Moderate | Moderate | Good | | | Polyglycerol 2-3 distribution: Glycerol 3.0%; diglycerol 42.4%; triglycerol 27.1%; tetraglycerol 13.0%; pentaglycerol 7.4%; hexaglycerol 5.8%; heptaglycerol 1.0%; octaglycerol 0.4%; and nonaglycerol and higher 0.1% |

Example 3

Sample 1: 90% X-155 (fatty acid distribution of about 0.1 myristic acid; 11.0% palmitic acid; 0.1 palmitoleic acid; 87.8% stearic acid; 0.5% oleic acid; 0.1% linoleic acid; 0.3% arachidic acid; and 0.1% behenic acid) was transesterified with 10% glycerol to provide a wax composition (Wax 3-1). A wax composition suitable for candles was made by combining 35 wt % of Wax 3-1 and 65 wt % fully hydrogenated soybean oil. The resultant wax yielded both container and pillar candles with an excellent appearance and good control of fat bloom. However, after a burn, free glycerol pools formed at the surface where the melted wax was re-congealing. Wiping away the pools of glycerol caused a pock-marked surface, suggesting phase separation is occurring at elevated temperatures.

Sample 2: 90% X-155 was transesterified with 10% polyglycerol (distribution: glycerol 60%; diglycerol 24%; triglcyerol 10%; tetraglycerol 5%; and pentaglycerol and higher 1%) to provide a morphology stable wax composition (Wax 3-2). A wax composition suitable for candles was made by combining 30 wt % of Wax 3-2 and 70 wt % fully hydrogenated soybean oil. The resultant wax composition yielded impressive container candles. In addition to a pleasing appearance, the candles showed good control of fat bloom. When cooling in the mold, the candles are preferably fan-cooled instead of air cooled, to avoid leaving a film on the mold. The difference between the melt point and the congeal point of this composition was only 5° C., which has positive implications for industrial uses in addition to candle wax.

Example 4

A transesterified wax (Wax 4-1) was prepared by transesterifying 10 wt % polyglycerol (OC-500) with 90 wt % X-155. The resulting wax had a hydroxyl value of 160. Into a two liter round bottom flask fitted with an agitator, nitrogen sparge, Dean Stark trap and condenser was placed 681.2 grams of Wax 4-1 and phthalic anhydride (108.9 g). With slow agitation the mixture was heated to 195° C. and the temperature maintained till the acid value was less than five. After ten hours at 195° C. an Acid Value of 4.9 was reached. The product was cooled. Analysis showed it to have a melt point of 61° C. and a congeal point of 49° C. The wax showed no signs of cracking or bloom formation. When striked, it acted much like that of paraffin.

The above-detailed embodiments and examples are intended to be illustrative, not exhaustive, and those skilled in the art will recognize that various equivalent modifications are possible within the scope of the invention. For example, whereas steps are presented in a given order, alternative embodiments may perform steps in a different order. The various embodiments described herein can be combined to provide further embodiments.

In general, the terms used in the following claims should not be construed to limit the invention to the specific embodiments disclosed in the specification unless the preceding description explicitly defines such terms. The inventors reserve the right to add additional claims after filing the application to pursue additional claim forms for other aspects of the invention.

What is claimed is:

1. A morphology stable wax composition comprising the (trans)esterification product of a wax-forming composition comprising: (a) a triglyceride stock, a fatty acid stock, or a mixture thereof; and (b) a glycerol-based composition comprising about 0 to about 70 wt % glycerol, about 20 to 40 wt % diglycerol, about 5 to 30 wt % triglycerol, about 0 to 20 wt % tetraglycerol, about 0 to 10 wt % pentaglycerol, about 0 to 10 wt % hexaglycerol, about 0 to 5 wt % heptaglycerol and higher order oligomers, and about 0 to 5 wt % cyclic polyglycerol.

2. The wax composition of claim 1, wherein the wax comprises a triglyceride stock.

3. The wax composition of claim 2, wherein the triglyceride stock comprises vegetable oil, animal-based oil, or mixtures thereof.

4. The wax composition of claim 2, wherein the triglyceride stock is non-hydrogenated, partially-hydrogenated or fully-hydrogenated.

5. The wax composition of claim 4, wherein the triglyceride stock is a vegetable oil selected from soybean oil, cottonseed oil, sunflower oil, canola oil, corn oil, peanut oil, safflower oil, palm oil, palm kernel oil, coconut oil, algal oil, jatropha oil, castor oil, or mixtures thereof.

6. Tile wax composition of claim 4, wherein the triglyceride stock is an animal-based oil selected from tallow, fish oil, chicken fat (or yellow grease), or mixtures thereof.

7. The wax composition of claim 4, wherein the triglyceride stock comprises fully-hydrogenated soybean oil.

8. The wax composition of claim 1, wherein the (trans) esterification is conducted in the presence of a catalyst.

9. The wax composition of claim 8, wherein the catalyst comprises lithium, sodium, potassium, magnesium, calcium, oxide, methyl oxide, antimony oxides, hydroxide, carbonate, phosphate, phosphite, hypophosphite, and salts thereof.

10. The wax composition of claim 8, wherein the catalyst comprises potassium hydroxide, sodium hydroxide, calcium hydroxide, or a combination thereof.

11. The wax composition of claim 1, wherein the glycerol-based composition comprises: about 75 wt % or greater total of polyglycerol species comprising diglycerol, triglycerol, and tetraglycerol; and up to about 10 wt % or less total of polyglycerol species of hexaglycerol and greater.

12. The wax composition of claim 1, wherein the glycerol-based composition comprises about 1 wt % to about 65 wt % glycerol.

13. The wax composition of claim 1, wherein the glycerol-based composition comprises about 1 wt % to about 20 wt % tetraglycerol.

14. The wax composition of claim 1, wherein the glycerol-based composition comprises about 30 wt % to about 65 wt % glycerol.

15. The wax composition of claim 1, wherein the glycerol-based composition comprises about 55 to 65 wt % glycerol; about 20 to 30 wt % diglycerol; about 5 to 15 wt % triglycerol; about 1% to 10 wt % tetraglycerol; and up to about 5 wt % pentaglycerol.

16. The wax composition of claim 1, wherein the glycerol-based composition comprises about 30 to 35 wt % glycerol; about 25 to 35 wt % diglycerol; about 15 to 20 wt % triglycerol; about 5 to 10 wt % tetraglycerol; up to about 5 wt % pentaglycerol; up to about 5 wt % hexaglycerol; and up to about 5 wt % cyclic glycerol.

17. The wax composition of claim 1, wherein the glycerol-based composition comprises up to about 5 wt % glycerol; about 30 to 40 wt % diglycerol; about 20 to 30 wt % triglycerol; about 10 to 20 wt % tetraglycerol; about 5 to 15 wt % pentaglycerol; about to about 10 wt % hexaglycerol; up to about 10 wt % heptaglycerol and higher order oligomers; and up to about 5 wt % cyclic glycerol.

18. The wax composition of claim 1, wherein the wax has a melting point ranging from about 43° C. to about 121° C.

19. The wax composition of claim 1, wherein the wax has a melting point ranging from about 51° C. to about 72° C.

20. The wax composition of claim 1, wherein the wax has a melting point and a congeal point; and wherein the difference between the melting point and the congeal point is about 10° C. or less.

21. The wax composition of claim 1, wherein the wax has a melting point and a congeal point; and wherein the difference between the melting point and the congeal point is about 5° C. or less.

22. The wax composition of claim 1, wherein the glycerol-based composition comprises about 0.1 wt % to about 35 wt % of the wax-forming composition.

23. The composition of claim 1, wherein the glycerol-based composition comprises about 5 wt % to about 30 wt % of the wax-forming composition.

24. The wax composition of claim 1, wherein the triglyceride stock comprises about 60 wt % to about 99.9 wt % of the wax-forming composition.

25. The wax composition of claim 1, wherein the wax-forming composition further comprises a diamine compound.

26. The wax composition of claim 25, wherein the diamine compound comprises hexamethylene diamine, ethylenediamine, or a mixture thereof.

27. A wax article comprising the morphology stable wax composition of claim 1.

28. The wax article of claim 27, wherein the wax article is a candle, stack waxes, jell candles, cosmetic, food coating, adhesive, board manufacturing (e.g., particle board and oriented strand board), urethane foams or coatings, alkyd coatings, coating formulation additive (e.g., paint, waterproof coatings, etc.), printing additives, polymer processing agent, extrusion processing aid, polymer plasticizer, mold release, polish, and stick markers.

\* \* \* \* \*